United States Patent [19]

Lipa

[11] Patent Number: 5,790,515
[45] Date of Patent: Aug. 4, 1998

[54] METHOD AND APPARATUS FOR SORTING WALSH INDEXES IN A COMMUNICATION SYSTEM RECEIVER

[75] Inventor: Robert A. Lipa, Aurora, Ill.

[73] Assignee: Motorola, Inc., Schaumburg, Ill.

[21] Appl. No.: 519,911

[22] Filed: Aug. 28, 1995

[51] Int. Cl.[6] .............. H04J 11/00; H04B 7/216
[52] U.S. Cl. .............. 370/209; 370/208; 370/335; 375/202; 375/206
[58] Field of Search .................. 370/22, 18, 21, 370/95.1, 110.1, 209, 208, 335, 441, 329, 342, 522; 375/200, 206, 208, 202; 379/63; 364/727

[56] References Cited

U.S. PATENT DOCUMENTS 5,313,489  5/1994  Menich et al. ............... 370/332
5,414,728  5/1995  Zehavi ......................... 375/200
5,511,067  4/1996  Miller .......................... 370/335
5,602,833  2/1997  Zehavi ......................... 370/209

*Primary Examiner*—Wellington Chin
*Assistant Examiner*—Melissa Kay Carman
*Attorney, Agent, or Firm*—Richard A. Sonnentag

[57] ABSTRACT

A communication system receiver sorts through potential Walsh indexes and determines survivors for use in subsequent processing. The sort process is implemented in parallel with the subsequent processing so that large amounts of memory to implement a store/sort are eliminated. The communication system receiver implements the sorting operation in a small number of cycles, thereby conserving cycles which could be beneficially utilized for other tasks as required. The sorting operation also lends itself well to a practical implementation from a communication system receiver design perspective.

22 Claims, 6 Drawing Sheets

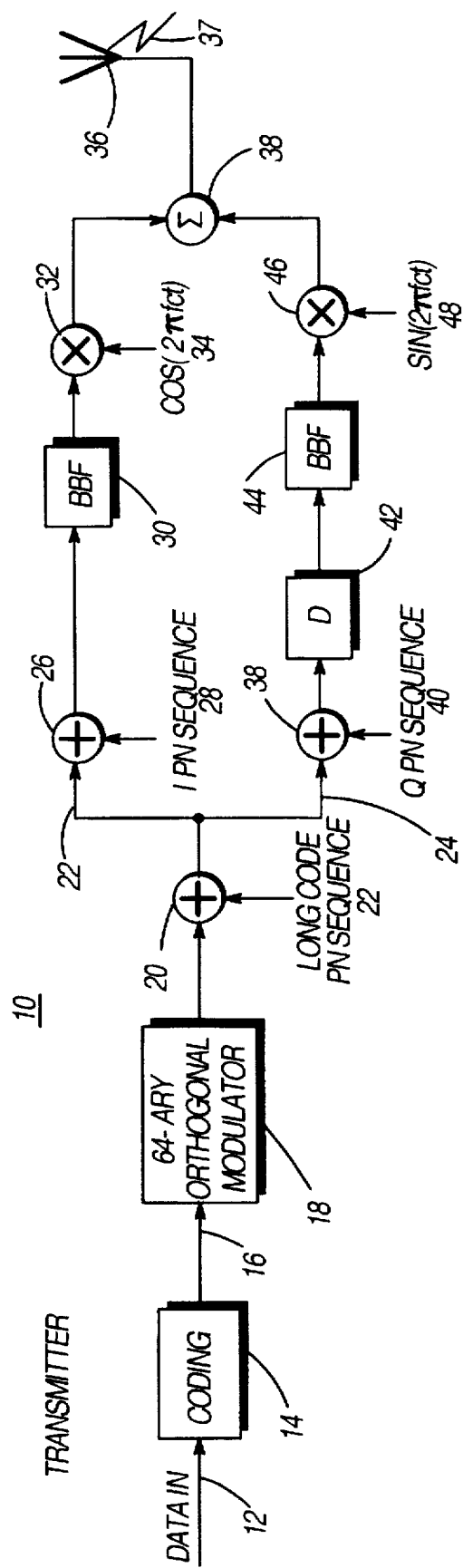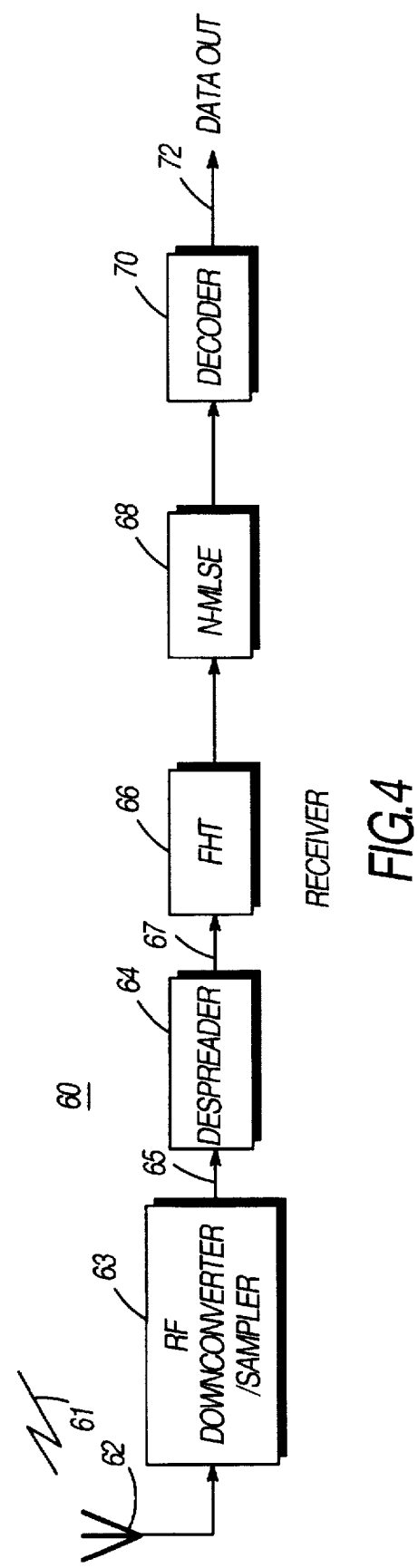
FIG.1
FIG.4

METHOD AND APPARATUS FOR SORTING WALSH INDEXES IN A COMMUNICATION SYSTEM RECEIVER

FIELD OF THE INVENTION

The present invention relates generally to the field of communications and more particularly to a method and receiver for demodulating a received signal.

BACKGROUND OF THE INVENTION

A Direct Sequence Code Division Multiple Access (DS/CDMA) cellular communication system, such as the one described in IS-95, is a self interference system. In such a communication system, a number of mobiles and/or portables use the same spectrum in the same geographical area. The signals from the subscriber units are differentiated from each other based on their spreading code (i.e. the user long code PN sequence and the I and Q PN sequences). The capacity limit of such a system is dependent on the amount of self interference in the system. An analogy used to illustrate this point is a cocktail party conversation. If you are at a cocktail party speaking to the person next to you and no one else is in the room with you, you do not have to speak very loud to be heard. When several more people enter the room and start conversing, you have to speak louder to be heard. In other words the self interference has increased and you have to increase your transmitter power to overcome the interference. As more and more people start talking in the room you have to speak louder and louder, and so do the other people in the room, in order to be heard. Eventually, you reach the point where it takes an infinite amount of power to be heard over the other people. That is the capacity limit.

Extending the cocktail analogy, if everyone in the room is hard of hearing you start with a higher level of interference from the other guests than if everyone has normal hearing. Thus, if everyone has better hearing the number of simultaneous conversations that can occur increases, i.e. the system capacity increases. As a result there is a considerable advantage in increasing the receiver's sensitivity in a DS/CDMA system. Any increase in receiver sensitivity directly reduces the amount of transmitter power required and as a result the amount of self interference. Increasing a cellular systems capacity increases an operator's revenue and improves the service the subscriber receives.

The standard receiver in a DS/CDMA system non-coherently detects the transmitted signal. Non-coherent detection does not take into account the phase difference between two transmitted signals. The standard non-coherent receiver first despreads the received signal (i.e. removes the I and Q PN sequences and the user's long code PN sequence) and accumulates a Walsh symbol of data. A Fast Hadamard Transform (FHT) is performed on the despread accumulated data. The FHT essentially correlates the despread signal against the sixty four possible Walsh symbols that could have been sent by the transmitter. The receiver then selects the Walsh symbol with the highest energy (where the energy is determined by summing the square of the I and Q vectors). The non-coherent receiver is an energy detector and does not use the phase of the transmitted signal. It is well known (Sklar, *Digital Communications*, ISBN 0-13-211939-0, Prentice Hall 1988, p. 161–164) that the bit error rate (BER) performance of coherent demodulation is superior to non-coherent demodulation.

Certain modifications to the standard receiver in a DS/CDMA system have been proposed to essentially provide psuedo-coherent detection of the transmitted signal. For example, in "Near Maximum Likelihood Demodulation for M-ary Orthogonal Signals" by Rod Walton and Mark Wallace, IEEE Conf. on Vehicular Technology, pp. 5–8, May 18–20, 1993, the authors propose the use of non-coherent ranks of individual symbols to improve the performance of the detector. The modification forms a near maximum likelihood sequence for symbols received and, based on the coherent energy of previous hypotheses, the unlikely hypotheses are discarded leaving a small number of survivors. As the symbols are processed, the surviving hypotheses tend to converge to the best estimate of the transmitted sequence. This method, as described by the authors, is impractical to implement in real-time since most cycles available during the time period of a power control group are consumed by the algorithm during the calculation of the transitional energy metrics, the time period when the energy of each of the possible transitions between the surviving paths and each point of the new Walsh symbol for the fingers are being calculated.

Thus there exists a need for a method and apparatus which improves the sorting process to determine survivors which utilizes less cycles to realize a practical implementation from a receiver design perspective.

BRIEF DESCRIPTION OF THE DRAWINGS

FIG. 1 generally depicts a block diagram of a transmitter compatible with a DS/CDMA cellular telephone system.

FIGS. 2(A) and 2(B) are a Walsh matrix utilized in a DS/CDMA cellular telephone system.

FIG. 4 generally depicts a block diagram of a receiver compatible with a DS/CDMA system and capable of implementing sorting in accordance with the invention.

DETAILED DESCRIPTION OF A PREFERRED EMBODIMENT

Figure 3:
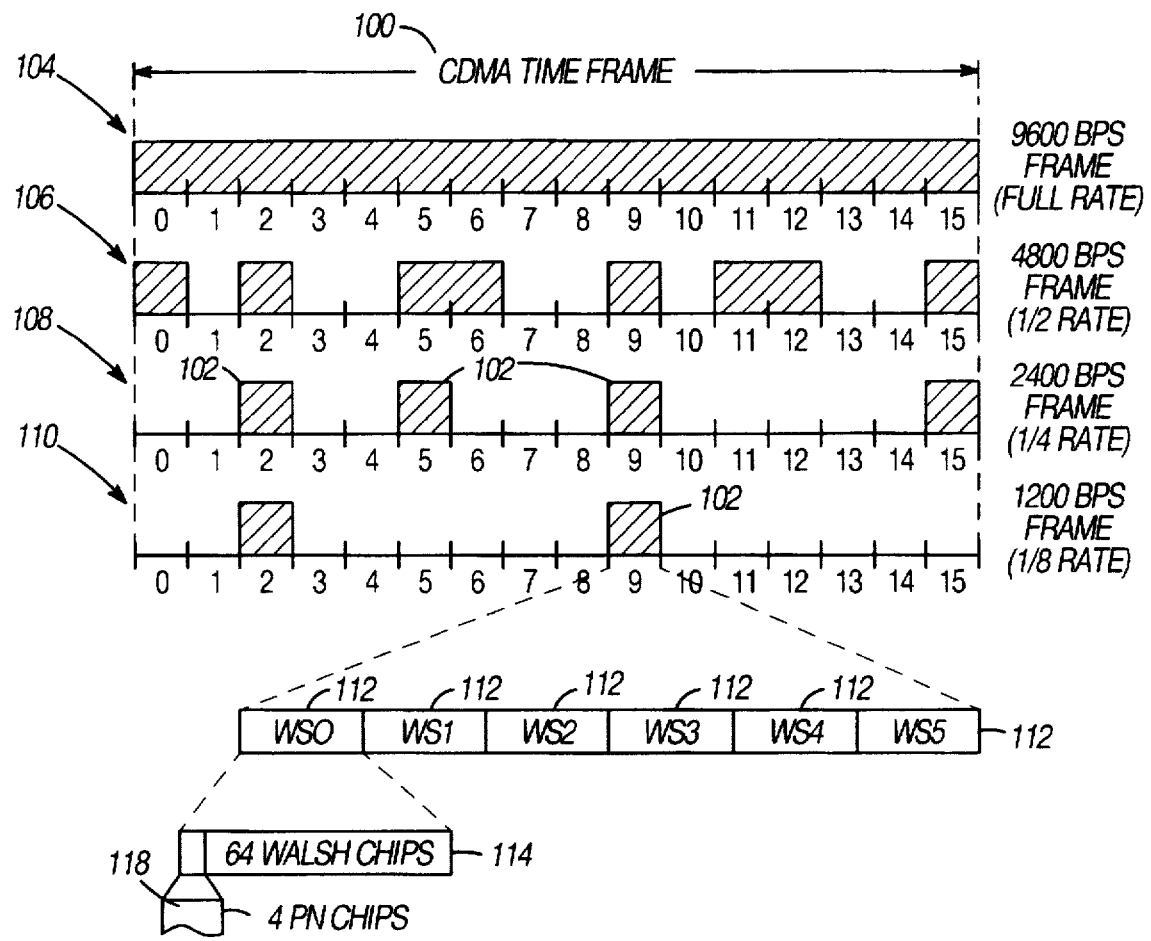
FIG. 3 generally depicts transmissions of various rate data during a CDMA time frame.

Generally stated, a communication system receiver sorts through potential Walsh indexes and determines survivors for use in subsequent processing. The sort process is implemented in parallel with the subsequent processing so that large amounts of memory to implement a store/sort are eliminated. The communication system receiver implements the sorting operation in a small number of cycles, thereby conserving cycles which could be beneficially utilized for other tasks as required. The sorting operation also lends itself well to a practical implementation from a communication system receiver design perspective.

More specifically, a communication system receiver sorts a plurality of Walsh indexes which are present in a plurality of Walsh symbols by determining the energy of each Walsh index present in one Walsh symbol of the plurality of Walsh symbols. The communication system receiver then compares the determined energy of each Walsh index with all other Walsh indexes present in the one Walsh symbol. The communication system receiver then stores data related to a predetermined number of Walsh indexes, in parallel with the determination of energy, for use in subsequent energy determinations of other Walsh indexes present in other Walsh symbols based on the comparison of the determined energy.

In the preferred embodiment, the determination of the energy is performed by a calculation of the energy of each Walsh index present in one Walsh symbol of the plurality of Walsh symbols. The data stored is data related to the accumulated index energy, accumulated I vectors, accumulated Q vectors and accumulated path history per stored index. The data which is stored is stored based on the highest determined energies. The process is (essentially) repeated for each Walsh symbol comprising a power control group, and the Walsh index determined to have the highest energy for each Walsh symbol represents that Walsh symbol transmitted during the power control group. The preferred embodiment communication system is a direct sequence code division multiple access (DS-CDMA) communication system, however other communication systems are contemplated which may beneficially implement the sorting operation in accordance with the invention.

Figure 2A:
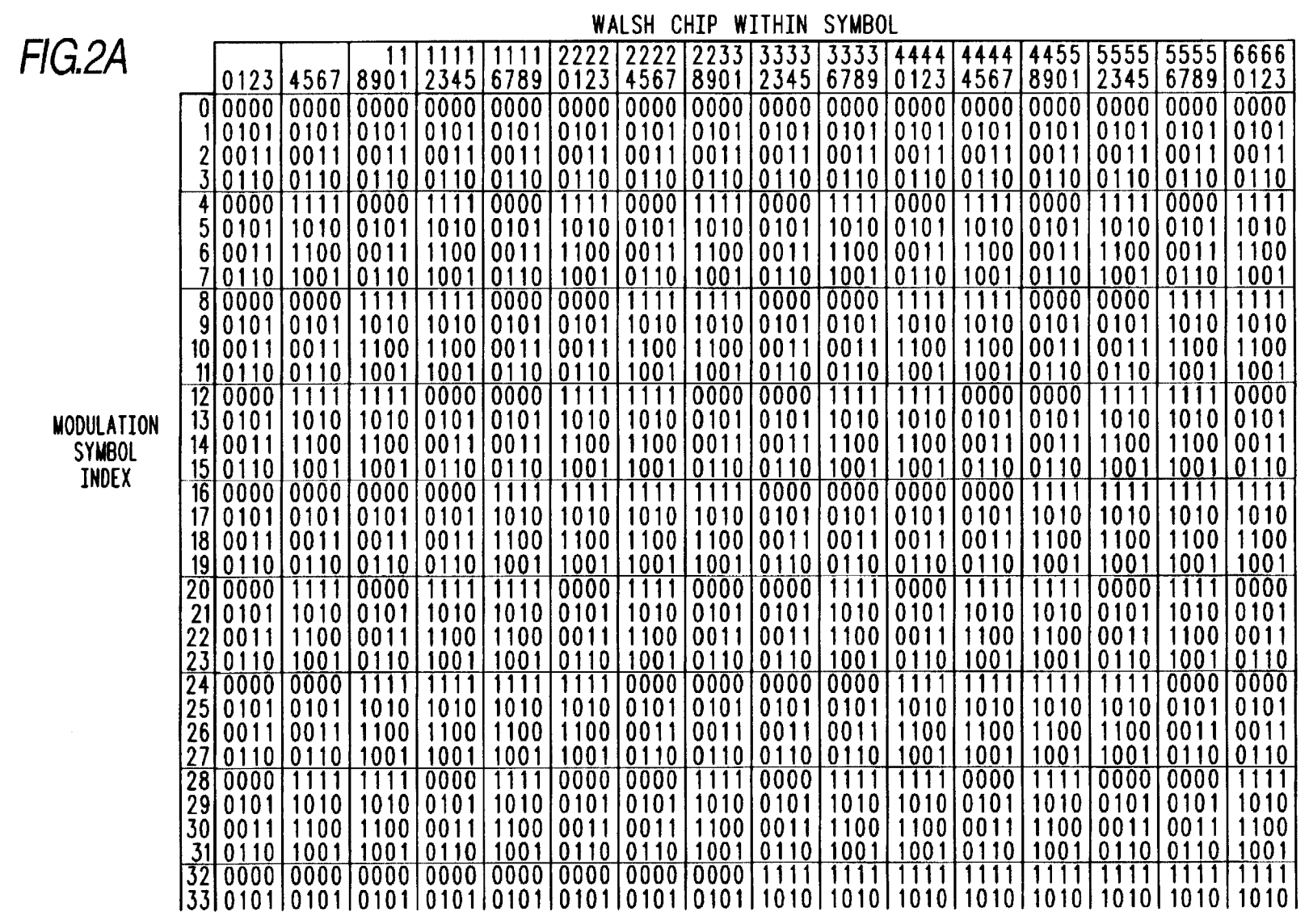
Figure 2B:
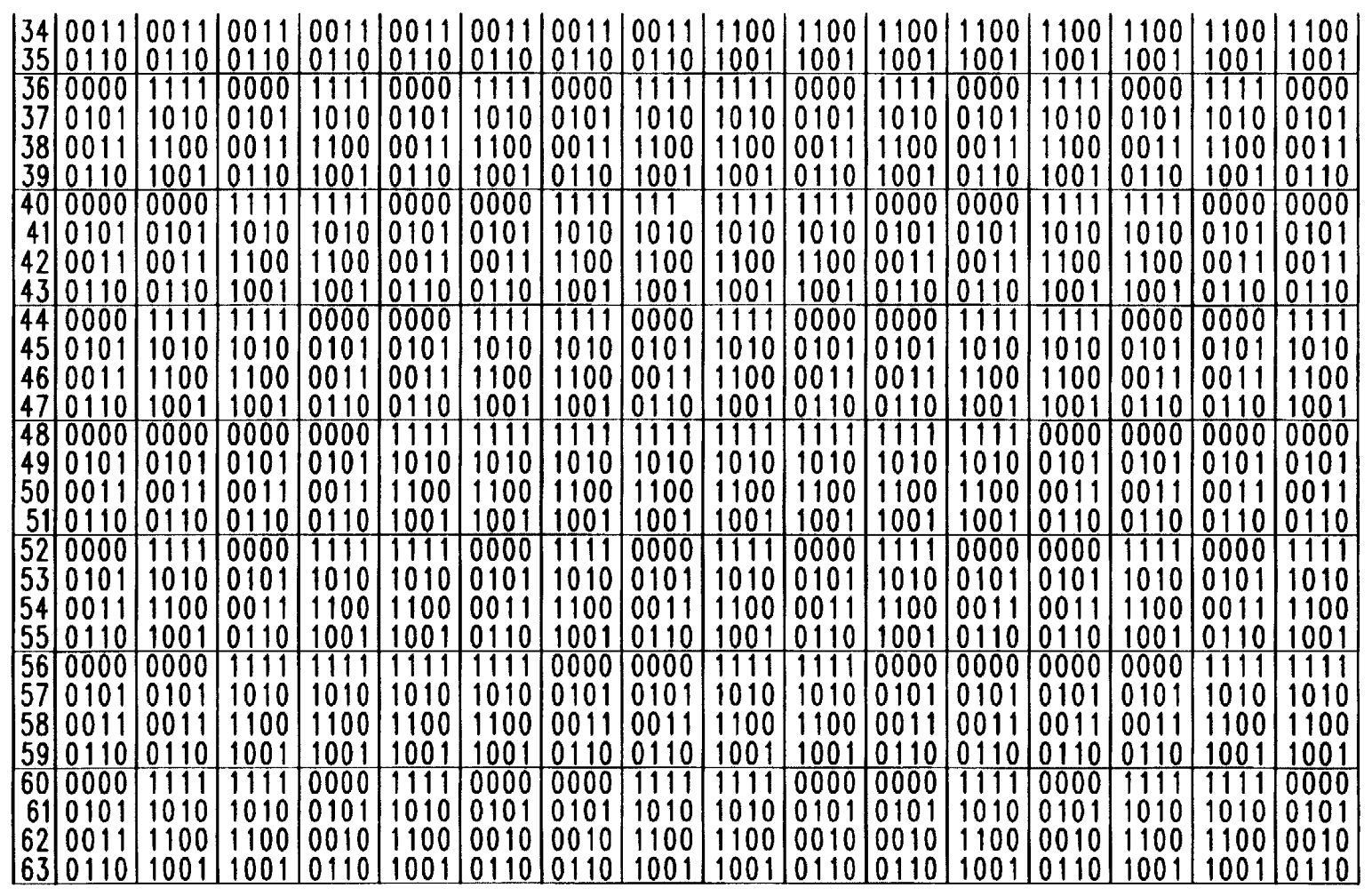

A block diagram of a transmitter compatible with a DS-CDMA cellular telephone system is generally depicted in FIG. 1. A voice signal or data signal 12 is input to a coding section 14, resulting in a coded signal 16. The coded signal 16 is mapped, preferably, six symbols at a time, to a unique 64-ary symbol by a 64-ary orthogonal modulator 18. In the preferred embodiment, the 64-ary orthogonal modulator is a Walsh matrix, shown in FIG. 2. The six coded symbols are mapped by the equation $C_0+2C_1+4C_2+8C_3+16C_4+32C_5=i$, where $C_{0-5}$ are the coded symbols and i is the index of the output Walsh symbol. Because the symbols are either 1 or 0 the equation uniquely maps the six symbols into one of the 64 Walsh indexes. The output of the 64-ary modulator is a Walsh symbol, that is made up of 64 Walsh chips (a row in the Walsh matrix).

Connected to the modulator is an adder 20, that sums a long pseudorandom noise (PN) sequence 22 with the Walsh chips. The output of the adder 20 is split into an in-phase or I channel 22 and a quadrature-phase or Q channel 24. The I channel 22 has an adder 26, which sums the output of adder 20 with an I PN sequence 28. The Q channel 24 has an adder 38, that sums the output of adder 20 and a Q PN sequence 40. The adder 38 is connected to a delay element 42. Then the I and Q data are bandpass filtered 30, 44, mixed 32, 46 and summed 34 to create the carrier frequency signal that is transmitted by an antenna 36. This results in offset QPSK modulation of the input data stream.

The input speech signal 12 can be either full rate (9600 bps) 104, half rate (4800 bps) 106, quarter rate (2400 bps) 108, or eighth rate (1200 bps) 110. FIG. 3 shows examples of transmissions of various rate data in a CDMA Time Frame 100. The time frame 100 is made up of sixteen power control groups (PCGs) 102. The PCGs 102 are made up of six Walsh symbols 112 and each Walsh symbol 112 is defined by 64 Walsh chips 114. Finally, each Walsh chip 114 has four PN chips 118. The incoming data rate, (full, half . . . ) is determined by the voice activity of the user. Periods where the user says little are encoded at eighth rate, while continuous quick speech might be encoded at full rate. Which power control groups are active during the time frame 100 is determined by the long code 22 and by the voice activity.

A block diagram of a receiver 60 compatible with a DS-CDMA system and capable of implementing sorting in accordance with the invention is generally depicted in FIG. 4. In actual implementation, the receiver to be used would be a four-path (or four-"finger") RAKE receiver, the general structure of which is well known in the art. As shown in FIG. 4, the receiver 60 depicts only a single finger of the above-mentioned four-finger RAKE receiver. Referring to FIG. 4, an antenna 62 receives a signal 61 which is then input into a RF downconverter/sampler 63. The RF downconverter/sampler 63 processes the received signal 61 with well known techniques to obtain an oversampled (e.g. eight times oversampled) baseband representation 65 of the received signal 61. The baseband representation 65 is input to a despreader 64 which reverses the Offset QPSK process using the long code PN sequence and the I and Q PN sequences as is well known in the art. The despread signal 67 is input to a Fast Hadamard Transform (FHT) 66, which correlates appropriate groups of sixty four received Walsh indexes against each of the sixty four possible Walsh indexes. The output of the FHT 66 is input into a Near-Maximum Likelihood Sequence Estimator (N-MLSE) 68 which attempts to estimate which Walsh indexes (based on the I and Q magnitudes) were transmitted for each Walsh symbol 112 of the PCG 102. The estimate information output by the N-MLSE 68 is input to a decoder 70 where the information in the transmitted signal 37 is reconstructed. The data out 72 of the decoder 70 is further processed and eventually presented to the end user in the form of speech data, fax data, etc.

Figure 5:
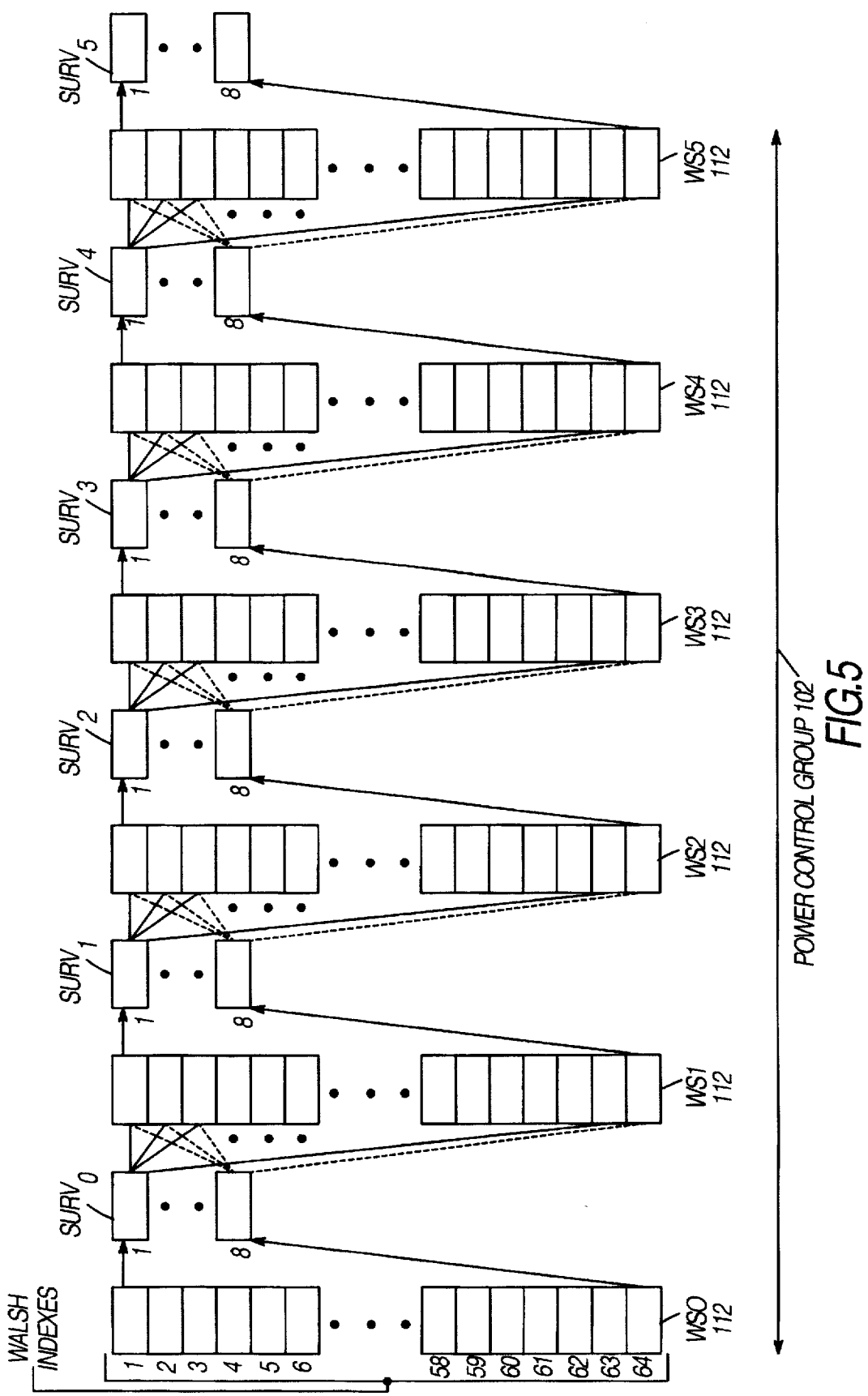
FIG. 5 generally depicts six Walsh symbols of a power control group undergoing survivor sorting.

The technique of N-MLSE estimation performed in the N-MLSE block 68 of FIG. 4 using the sorting in accordance with the invention is best explained with reference to FIG. 5. Referring to FIG. 5, the six Walsh symbols (WS0–WS5) 112 represent the Walsh symbols transmitted in the PCG 102 (as shown in FIG. 3). For the first Walsh symbol WS0 of the PCG 102, the energy of each vector I and Q (for each Walsh index 0–63) is calculated by transforming the 64-ary Walsh symbol using the Fast Hadamard Transform (FHT), squaring the I & Q vectors (again for each Walsh index 0–63), and vector adding the $I^2$ and $Q^2$ vectors. The energy vectors (for all possible indexes) of the fingers are then combined, and from the combined energy vector, a set of surviving Walsh indexes are selected. In the preferred embodiment, the data for eight surviving Walsh indexes are saved, but any number of Walsh indexes may be used as survivors. The data for eight surviving Walsh indexes saved includes the I & Q magnitudes after being transformed by the FHT and the Walsh Indexes of the eight best indexes. The eight best indexes also represent the surviving path histories. Referring to FIG. 5, the data of the eight surviving indexes (for WS0) is stored in the column labeled SURV0. The I & Q magnitudes of the eight survivors are the accumulated I & Q vectors for each of the fingers of the RAKE, and will be used in the next trellis calculation.

At this point, the Walsh symbols 112 yet to be processed (WS1–WS5 as shown in FIG. 5) of the PCG 102 are vector rotated to remove any frequency offset. After rotating the I & Q data of WS1, each of the eight surviving I & Q vectors (from SURV0) are summed with the magnitudes of each index of the rotated 64-ary complex vectors located in WS1. The result is a new list of energies which total 8×64 (or 512) total energies. These energies are sorted, and the data for the eight largest energies (out of the 512 total) is saved in SURV1.

The process of rotating the vectors, summing the surviving I & Q values with the rotated I & Q vectors, calculating path energies and sorting based on energies continues for WS2–WS5 until columns SURV2–SURV5 are filled. At the end of the PCG 102, the path with the highest energy (from each of the survivor columns SURV0–SURV5) represents the six Walsh symbols transmitted during the PCG.

As previously stated, the algorithm to implement N-MLSE in block 68 consumes the most cycles during the calculation of the transitional energy metrics, the time period when the energy of each of the possible transitions between the surviving paths and each index of the new Walsh symbols for the fingers are being calculated.

Figure 6:
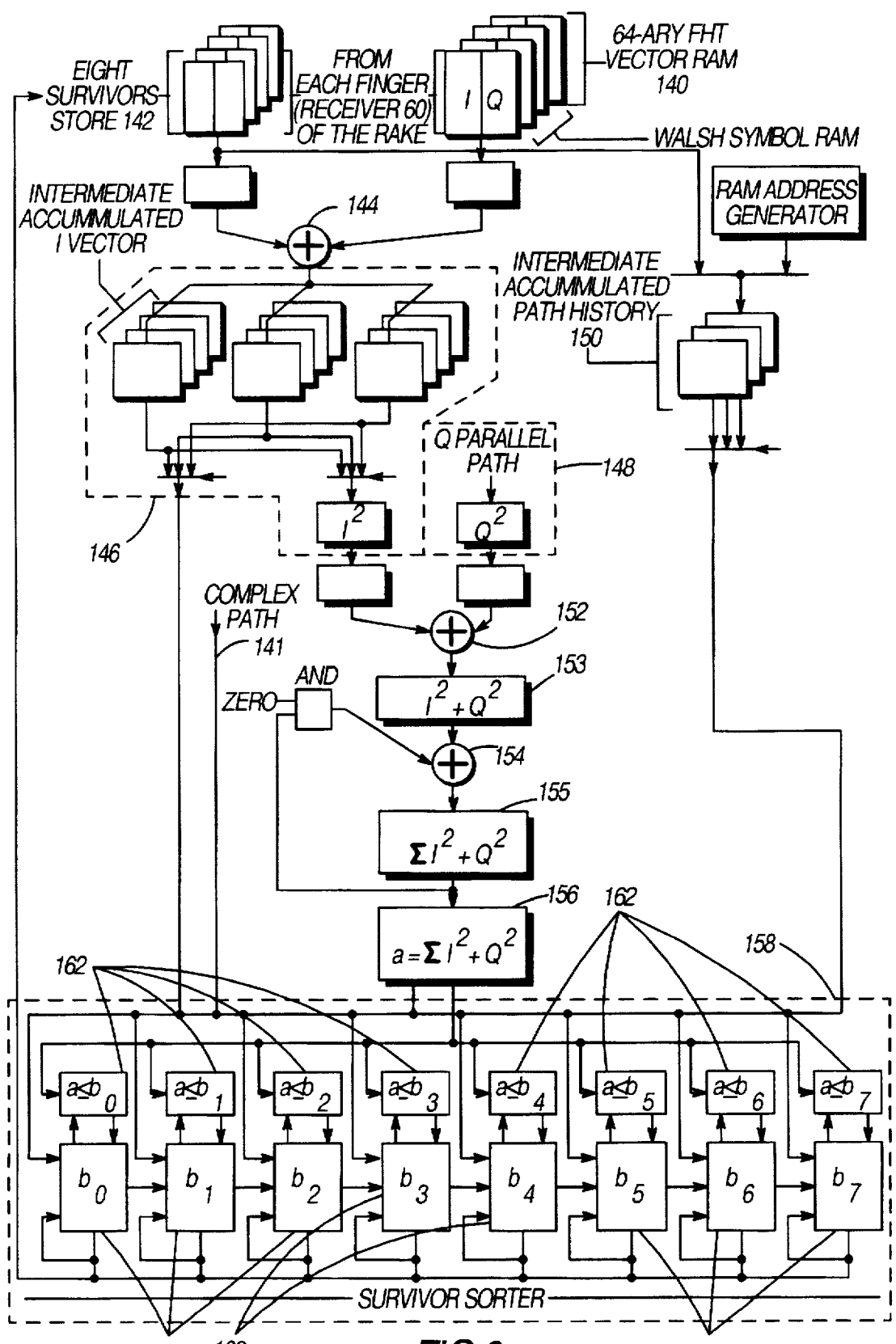
FIG. 6 generally depicts a circuit implementation to achieve survivor sorting in accordance with the invention.

A circuit implementation to achieve survivor sorting for eight survivors in accordance with the invention is generally depicted in FIG. 6. The N-MLSE algorithm commences at the beginning of a PCG 102. The 64-ary I & Q magnitudes for each of the four fingers (implemented using four separate receivers 60) are stored in four 64-ary FHT Vector RAMS 140. The N-MLSE demodulation implementation implies a complex data path. One branch 141 of the complex path is shown in FIG. 6. After the first Walsh symbol (WS0) 112 is processed and the eight survivors as shown in FIG. 5 as SURV0), the eight survivors are stored in the survivor sorter 158 of FIG. 6. The addressing of the 64-ary FHT Vector RAM 140 occurs so that the signed magnitudes of the I & Q data after FHT Transform for Index(n) are read for all four fingers of the RAKE.

For the first operation of a new PCG 102, the FHT transformed I & Q data of Index(O) will be read for the four fingers of the RAKE. The intermediate accumulated I vectors for the four fingers and the FHT transformed I data are temporarily stored in store 146 (the same information for Q is stored in store 148). The intermediate accumulated path history is temporarily stored in store 150. The (temporary) storage time is the time it takes to calculate the combined energy of the four fingers of the RAKE. The energy (for each of the possible transitions between the survivors and the possible 64 indexes) of the four rakes is calculated at points 153–156 from the summation of the previously described I and Q vectors over the Walsh indexes I and Q magnitudes contained in 114. The calculation can be performed by a microprocessor or an application specific integrated circuit (ASIC) as one of ordinary skill in the art will appreciate. The four energies for the index are summed to produce the combined energy of the chip. The combined energy of the index for the four fingers of the rake are presented to the survivor sorter 158.

The survivor sorter 158 comprises elements which include registers 160 and comparison circuits 162. The elements of the survivor sorter 158 may be implemented as multi-port D flip-flops or mult-port latches. The eight registers 160 contain metrics (e.g., the energy of the accumulated path, the accumulated I vector, the accumulated Q vector, and the path history) for that Walsh index 114. At the beginning of each PCG 102, the metrics are zeroed (reset). Since this is the first energy calculation, the sorter compares the new combined energy to the previous energy at sorter address 0–7. The survivor sorter 158 stores the energy, accumulated I and Q vectors, and accumulated path history at the first sorter address which is greater than the current combined energy stored in the survivor sorter 158. The current energy and contents of the survivor sorter 158 at the address (and the energies and contents of the sorter at lower addresses) will be pushed one address lower in the survivor sorter 158. For the first index 114 of a Walsh symbol, there would be an accumulated path energy, an accumulated I vector, an accumulated Q vector, and the accumulated path history, stored in address 0 the sorter. This process continues for the remaining 63 indexes of the first Walsh symbol (WS0) of the PCG 102 as described below.

As the energy for the next possible index is being accumulated in register 155, the energy in register 156 is compared (by the comparators 162) to all the energies accumulated in the registers 160. The comparison results in a vector which indicates where the new metric should be inserted into the survivor sorter 158. For example, if the energy in register 156 is greater than the accumulated energy in registers $b_4$–$b_7$ of the registers 160, the comparison vector with the output of the comparators numbered from 0–7 would be, for example, 00001111. It is noted that bit zero of the comparison vector has an implied leading zero. Comparison vector bits with a zero value indicate that element of the survivor sorter 158 retains it current contents. The transition from zero to one in the comparison vector bit n−1 and bit n indicates that element n should be updated with the metrics of the new survivor. Comparison vector indexes of 11 for bit n−1 and bit n indicate that element n should be updated with the survivor metric in the element n−1. At the end of the first Walsh symbol (WS0), the eight surviving indexes (those indexes having the highest energies) and their associated metrics are rank ordered in the survivor sorter 158. At this point, the accumulated I vectors, the accumulated Q vectors, and the accumulated path histories for the surviving indexes are transferred from the survivor sorter 158 to the store 142.

For the second Walsh symbol (WS1) of the PCG 102, the rotated transformed I & Q vectors are stored in the FHT Vector RAM 140. For each of the eight accumulated indexes, the accumulated I and Q vectors will be summed with each of the 64 rotated transformed I & Q vectors of WS1 on a per finger basis. The energy of each of the possible paths for each finger and the combined energy for each of the possible indexes is calculated. At the end of WS2, the data (accumulated energy, accumulated I vectors, accumulated Q vectors and accumulated path history) from the eight indexes having the highest accumulated energy is stored in the survivor sorter 158, and then transferred to the store 142.

The above process continues for the Walsh symbols WS2–WS5 of the PCG 102. At the end of the PCG 102, the surviving path with the largest accumulated path combined energy would be in address 0 of the survivor sorter 158. This element contains the path of the six Walsh symbols transmitted during the PCG 102.

So that the survivor sorter 158 runs in (essentially) parallel with the FHT block 66 and the calculation of the energies at points 152–156 to effectively yield sorting with reduced cycles in accordance with the invention, the comparison and surviving sort operation are synchronized to the global state machine which drives the N-MLSE 68. With this implementation, a new combined energy for a N-MLSE path (as seen at point 155 of FIG. 6) can be calculated every four cycles. The surviving sort operation takes only two cycles— one cycle for the comparison in comparators 162 and one cycle for the surviving sort operation in registers 160. As a result, at the end of all the path calculations, no additional sorting operations need to be done and additional RAM to store the data for sorting is eliminated. While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What I claim is:

1. A method of sorting a plurality of Walsh indexes in a communication system receiver, the plurality of Walsh indexes present in a plurality of Walsh symbols, the method comprising the steps of:

determining the energy of each Walsh index present in one Walsh symbol of the plurality of Walsh symbols;

comparing the determined energy of each Walsh index with all other Walsh indexes present in the one Walsh symbol;

sorting a predetermined number of Walsh indexes, in parallel with the step of determining, for use in subsequent energy determinations of other Walsh indexes present in other Walsh symbols to produce sorted Walsh indexes based on the step of comparing the determined energy; and storing data related to the sorted Walsh indexes.

2. The method of claim 1, wherein the step of determining further comprises the step of calculating the energy of each Walsh index present in one Walsh symbol of the plurality of Walsh symbols.

3. The method of claim 1, wherein the data related to the sorted Walsh indexes further comprises an accumulated index energy, accumulated I vectors, accumulated Q vectors and accumulated path history per sorted Walsh index.

4. The method of claim 1, wherein the step of sorting Walsh indexes based on the step of comparing the determined energies further comprises the step of sorting Walsh indexes based on the highest determined energies.

5. The method of claim 1, further comprising the steps of:

determining the energy of each Walsh index present in a second Walsh symbol of the plurality of Walsh symbols;

combining the energy of the predetermined number of the Walsh indexes with the determined energy of each Walsh index present in the second Walsh symbol;

comparing the combined energies with one another;

sorting a predetermined number of Walsh indexes, in parallel with the steps of determining and combining, for use in subsequent energy determinations of other Walsh indexes present in other Walsh symbols to produce sorted Walsh indexes based on the step of comparing the combined energy; and storing data related to the sorted Walsh indexes.

6. The method of claim 5, wherein the step of sorting Walsh indexes based on the step of comparing the combined energies further comprises the step of sorting Walsh indexes based on the highest combined energies.

7. The method of claim 6, wherein the step of sorting Walsh indexes based on the highest combined energies is repeated for each Walsh symbol of a power control group.

8. The method of claim 7, wherein the Walsh index determined to have the highest energy for each Walsh symbol represents a Walsh index utilized during a transmission of each Walsh symbol.

9. The method of claim 8, wherein the communication system receiver is compatible with a direct sequence code division multiple access (DS-CDMA) communication system.

10. An apparatus for sorting a plurality of Walsh indexes in a communication system receiver, the plurality of Walsh indexes present in a plurality of Walsh symbols, the apparatus comprising:

means for determining the energy of each Walsh index present in one Walsh symbol of the plurality of Walsh symbols;

means, coupled to said means for determining, for comparing the determined energy of each Walsh index with all other Walsh indexes present in the one Walsh symbol;

means, coupled to said means for comparing, for sorting a predetermined number of Walsh indexes, in parallel with the energy determination, for use in subsequent energy determinations of other Walsh indexes present in other Walsh symbols to produce sorted Walsh indexes based on the comparison of the determined energy; and means for storing data related to the sorted Walsh indexes.

11. The apparatus of claim 10, wherein the means for determining further comprises means for calculating the energy of each Walsh index present in one Walsh symbol of the plurality of Walsh symbols.

12. The apparatus of claim 10, wherein the data data related to the sorted Walsh indexes further comprises accumulated index energy, accumulated I vectors, accumulated Q vectors and accumulated path history per stored index.

13. The apparatus of claim 10, wherein the means for sorting Walsh indexes based on the comparison the determined energies further comprises means for sorting Walsh indexes based on the highest determined energies.

14. The apparatus of claim 10, wherein the means for determining further comprises means for determining the energy of each Walsh index present in a second Walsh symbol of the plurality of Walsh symbols.

15. The apparatus of claim 14, wherein the means for determining the energy of each Walsh index present in a second Walsh symbol further comprises means for combining the energy of the predetermined number of the Walsh indexes with the determined energy of each Walsh index present in the second Walsh symbol.

16. The apparatus of claim 15, wherein the means for comparing further comprises means for comparing the combined energies with one another.

17. The apparatus of claim 16, wherein the means for sorting Walsh indexes further comprises means for sorting Walsh indexes related to a predetermined number of Walsh indexes, in parallel with the energy determination and combining, for use in subsequent energy determinations of other Walsh indexes present in other Walsh symbols based on the comparison of the combined energy.

18. The apparatus of claim 17, wherein the means for sorting Walsh indexes based on the comparison of the combined energies further comprises means for sorting Walsh indexes based on the highest combined energies.

19. The apparatus of claim 18, wherein the Walsh index determined to have the highest energy for each Walsh symbol represents a Walsh index utilized during a transmission of each Walsh symbol.

20. The apparatus of claim 10, wherein the communication system receiver is compatible with a direct sequence code division multiple access (DS-CDMA) communication system.

21. An apparatus for sorting a plurality of Walsh indexes in a code division multiple access (CDMA) communication system receiver, the plurality of Walsh indexes present in a plurality of Walsh symbols, the apparatus comprising:

a processor for determining the energy of each Walsh index present in one Walsh symbol of the plurality of Walsh symbols;

a comparison circuit, coupled to the processor, for comparing the determined energy of each Walsh index with all other Walsh indexes present in the one Walsh symbol;

a register, coupled to the comparison circuit, for sorting Walsh indexes related to a predetermined number of Walsh indexes, in parallel with the energy determination, for use in subsequent energy determinations of other Walsh indexes present in other Walsh symbols to produce sorted Walsh indexes based on the comparison of the determined energy; and a store for storing data related to the sorted Walsh indexes.

22. The apparatus of claim 21, wherein the Walsh symbols comprise Walsh symbols of a power control group.

* * * * *